No. 746,652. PATENTED DEC. 15, 1903.
J. G. ACCLES, F. H. DE VEULLE & W. STARLEY.
MOTOR CYCLE.
APPLICATION FILED MAY 21, 1903.
NO MODEL. 2 SHEETS—SHEET 1.

WITNESSES
INVENTORS

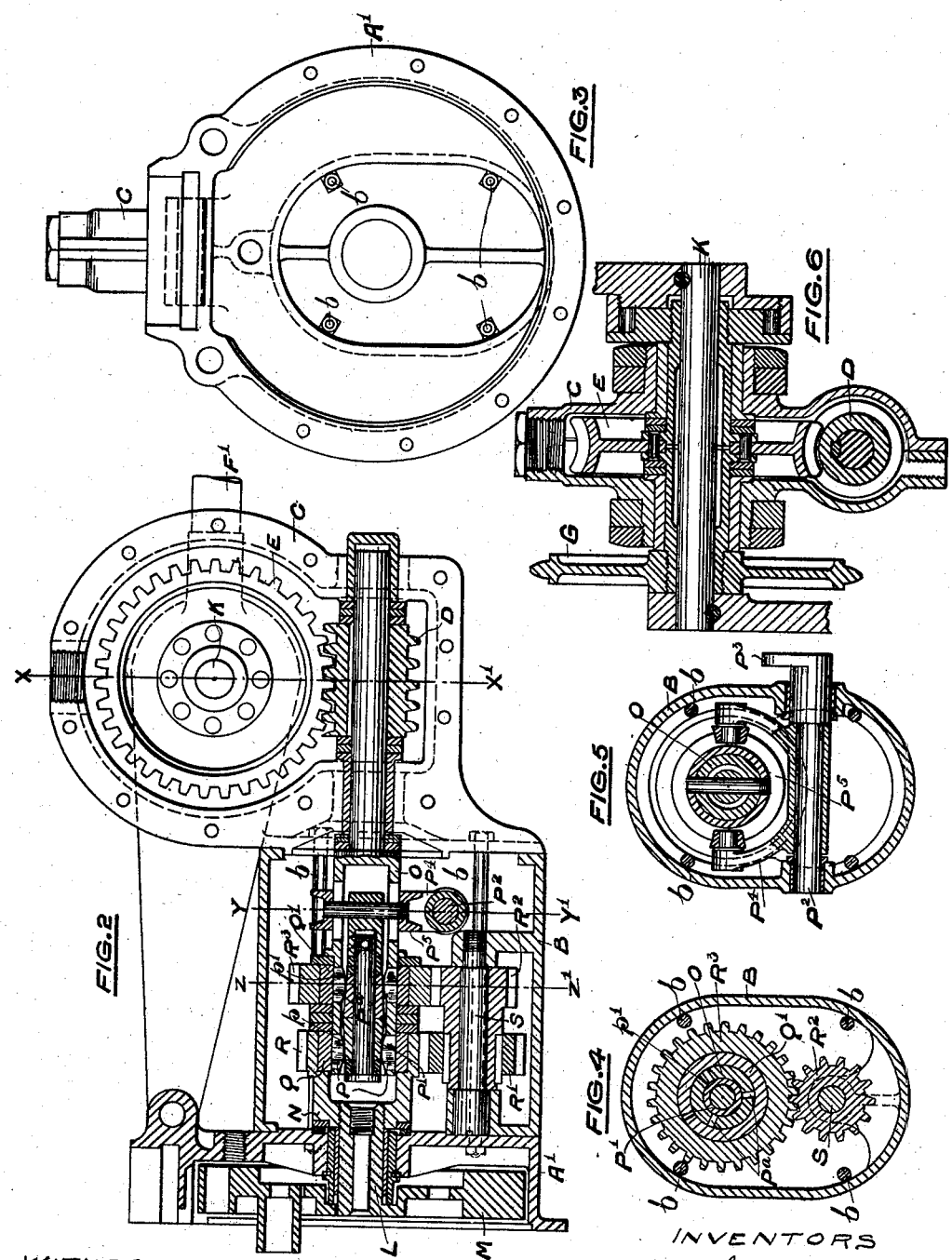

No. 746,652.                                    Patented December 15, 1903.

UNITED STATES PATENT OFFICE.

JAMES GEORGE ACCLES AND FREDERICK HENRY DE VEULLE, OF BIRMINGHAM, AND WILLIAM STARLEY, OF COVENTRY, ENGLAND.

MOTOR-CYCLE.

SPECIFICATION forming part of Letters Patent No. 746,652, dated December 15, 1903.

Application filed May 21, 1903. Serial No. 158,124. (No model.)

*To all whom it may concern:*

Be it known that we, JAMES GEORGE ACCLES and FREDERICK HENRY DE VEULLE, residing at Holford House, Perry Barr, Birmingham, and WILLIAM STARLEY, residing at 16 Queen's road, Coventry, England, all subjects of the King of Great Britain and Ireland, have invented certain new and useful Improvements Relating to Motor-Cars, (for which we have filed an application in Great Britain, No. 4,418, bearing date February 25, 1903,) of which the following is a specification.

This invention relating to motor-cycles comprises the combination, with compactly-arranged worm-gearing transmitting the power of the motor, of variable-speed mechanism adapted for effecting the quick movement of the motor for starting purposes, with a pedal movement slow enough to permit of the propulsion of the complete machine without undue effort by the rider.

Figure 7:
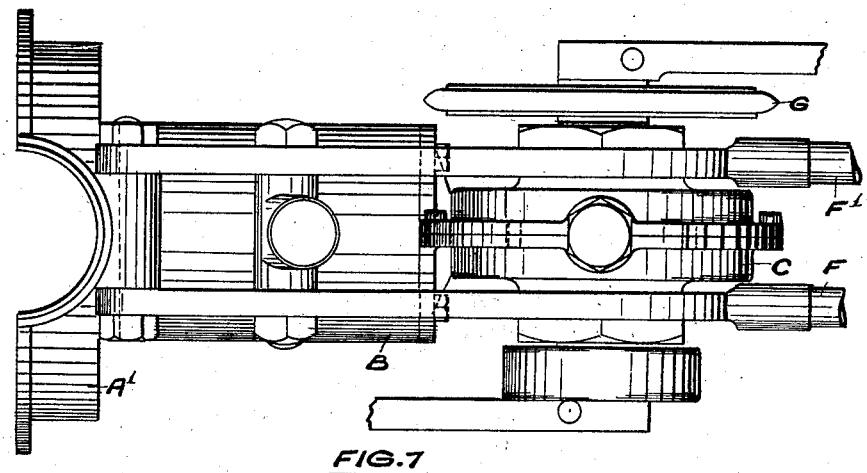
Figure 1:
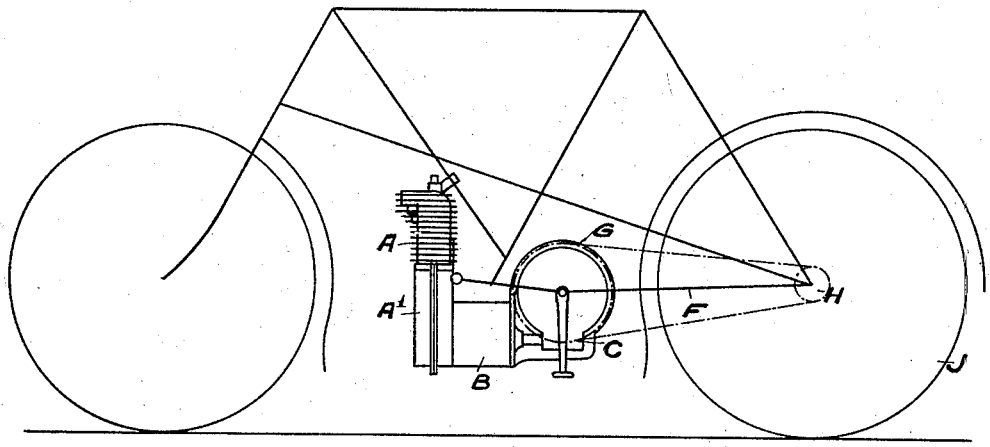

Referring to the two accompanying sheets of explanatory drawings, Figure 1 is a diagrammatic view illustrating the disposition of the motor and driving-gear in relation to the cycle-frame on which they are mounted. Fig. 2 is a sectional side elevation showing the worm-gear and the speed gear or mechanism arranged in connection with the same for the purpose aforesaid. Fig. 3 is an end view of the connected casings for the said worm-gearing and speed mechanism. Figs. 4, 5, and 6 are sectional end views on the lines $ZZ'$, $YY'$, and $XX'$, Fig. 2, respectively. Fig. 7 is a plan of the parts shown at Fig. 2.

The same reference-letters in the different views indicate the same parts.

The oil or other motor A is suspended from the framing of the machine, preferably in a position such as illustrated at Fig. 1, the center line of the motor crank-shaft being coincident with the longitudinal center line of the said framing, thus giving a direct drive-line between the motor and the worm-gear. The crank and fly-wheel casing part A' of the said motor has secured to it one end of the speed-gear casing B. The other end of the said casing is secured to the two-part casing C, containing the worm-gear comprised by the worm D and the worm-wheel E. The speed-gear and worm-gear are effectually inclosed and protected by their casings against dust and dirt. The connection of the three casings A', B, and C is preferably effected by screwed bolts, as $b$.

The two-part casing C of the worm-gear is clamped or mounted between a pair of boss-like brackets forming part of the chain stay F F'. The bearings both for the worm D and the worm-wheel E are provided in the said casing C, as illustrated, and in rigid connection with the worm-wheel E is the chain-wheel G for transmitting the power to the corresponding chain-wheel H, which is in connection with the rear road-wheel J of the complete machine. The connection between the worm-wheel E and the pedal crank-shaft or spindle K is effected through an automatic or free wheel-clutch of any well-known type, such as illustrated.

The portion L of the motor crank-shaft on which the combined crank and fly-wheel disk part M is fixed is connected by a hollow sleeve part N with the enlarged hollow end O of the worm-spindle through the medium of wedge-keys, as P, arranged upon or within the said hollow end O and operated by the conical surface $p$ of a sliding plug P', arranged in the center of O. On causing the plug P' to slide, which is accomplished by means of a rocking shaft $P^2$, fitted with an operating-lever or like part, as $P^3$, and a fork $P^4$, transmitting the movement of the shaft $P^2$ to the sleeve or collar $P^5$, to which the plug P' is attached, the wedges P, acting upon the split or segmental grip-ring Q, effect the connection or disconnection of the said sleeve part N with the said end O of the worm-wheel shaft or spindle. When the parts are in connection, the motor crank-shaft and the worm-shaft rotate as one piece, as is required for the driving of the machine by the motor in the ordinary way; but for starting purposes the grip-ring Q is released and the two shafts aforesaid connected indirectly by way of the speed-gear hereinbefore referred to. Such gear comprises a toothed wheel R, formed with or secured to the sleeve part N and engaging a wheel R', running loosely upon the pin S, but secured with the wheel $R^2$, which engages the wheel $R^3$, mounted upon the clutch or grip ring Q' adjacent to the aforesaid ring Q on the hollow end O of the worm-shaft. By means of the conical surface $p'$ of the sliding plug P', operating the wedge-keys $P^a$, the said wheel can be connected or disconnected with the said end O. It is placed in connection by means of the lever $P^3$ aforesaid, and the rotation of the worm-wheel by pedaling is then transmitted to the motor through the aforesaid gear-wheels, which are so proportioned as to cause the motor crank-shaft to rotate at a higher speed to facilitate the starting of the motor.

After the motor has itself commenced to drive the vehicle the aforesaid speed-gear can, if desired, be thrown out of action, so that the worm shall be driven directly from and at the same rate as the motor crank-shaft. At any time, however, the gear can be put into action for hill-climbing or for slow running of the vehicle.

Having thus described our invention, what we claim as new, and desire to secure by Letters Patent, is—

1. In motor-cycles, the combination with the motor crank-shaft of worm-gearing having a chain driving-wheel in permanent connection and pedal-cranks in automatic clutch connection therewith, speed-gear, and duplicate clutches respectively and detachably connecting the said crank-shaft and worm directly and through the said speed-gear, substantially as set forth.

2. In motor-cycles, the combination with the motor crank-shaft, of worm-gearing having a driving-wheel in permanent connection and pedal-cranks in automatic clutch connection therewith, speed-gear, duplicate clutches respectively connecting the said crank-shaft directly and through the said speed-gear, cases respectively inclosing the said worm and speed gears, and clamping-bolts securing the said cases to each other and to the motor, substantially as set forth.

3. In motor-cycles with worm-gearing, having a chain driving-wheel in permanent connection and pedal-cranks in automatic clutch connection therewith, the combination consisting of a gear-wheel R integral or in permanent connection with the motor crank-shaft, a gear-wheel $R^3$ carried loosely upon the worm-shaft, connected wheels R' and $R^2$ respectively engaging the said wheels R and $R^3$, and duplicate clutches respectively and detachably connecting the said worm-shaft with the said wheels R and $R^3$, substantially as set forth.

4. In motor-cycles with worm-gearing having a chain driving-wheel in permanent connection and pedal-cranks in automatic clutch connection therewith, the combination consisting of a gear-wheel R integral or in permanent connection with the motor crank-shaft, a gear-wheel $R^3$ carried loosely upon the worm-shaft, connected wheels R' and $R^2$ respectively engaging the said wheels R and $R^3$, duplicate clutches respectively and detachably connecting the said worm-shaft with the said wheels R and $R^3$, and means for the operation of the said clutches consisting of wedge-keys a double-coned plug and a rocking lever with connected fork and sliding sleeve, substantially as set forth.

In witness whereof we have hereunto set our hands in the presence of two witnesses.

JAMES GEORGE ACCLES.
FREDERICK HENRY DE VEULLE.
WILLIAM STARLEY.

Witnesses:
J. MORGAN,
H. DAVIS.